Sept. 1, 1953　　　G. B. R. FEILDEN ET AL　　　2,650,815
SPEED GOVERNOR
Filed Sept. 18, 1950　　　　　　　　　　　　　　　6 Sheets-Sheet 1

Inventors
G. B. R. FEILDEN &
R. E. WIGG
By Wilkinson & Mawhinney
Attorneys

Sept. 1, 1953  G. B. R. FEILDEN ET AL  2,650,815
SPEED GOVERNOR
Filed Sept. 18, 1950  6 Sheets-Sheet 2
FIG. 2.
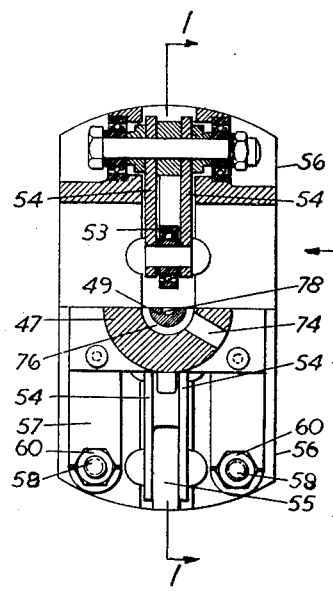
FIG. 5
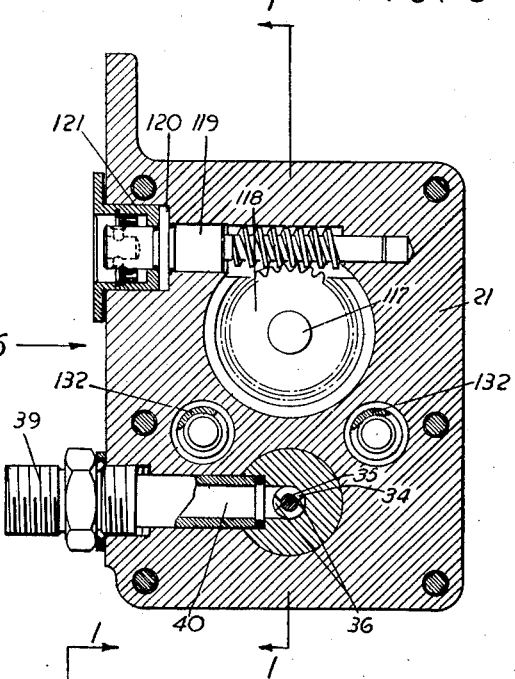
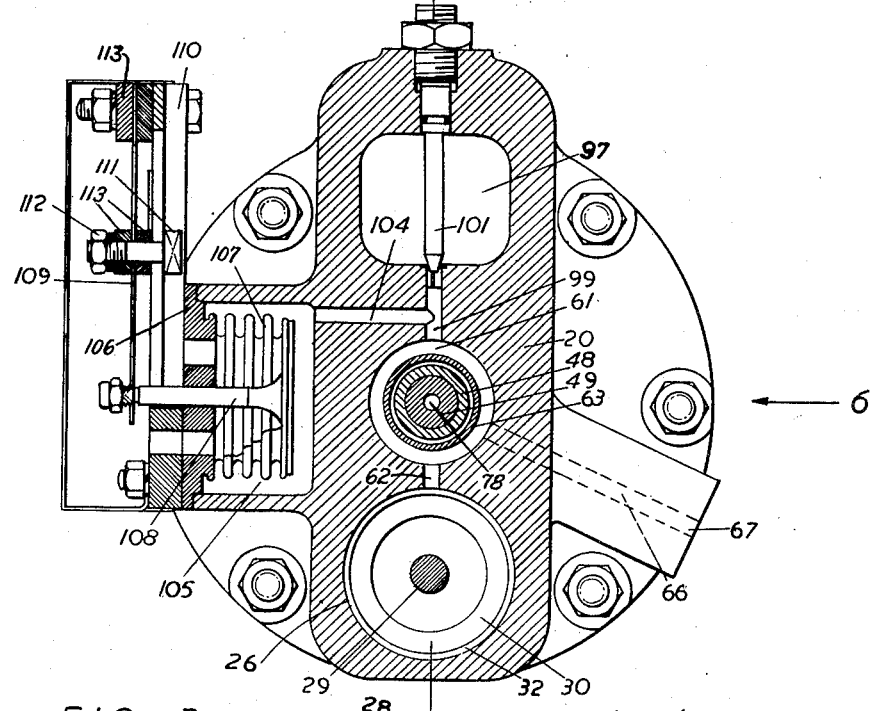
FIG. 3.
Inventors
G. B. R. FEILDEN &
By R. E. WIGG
Wilkinson & Mawhinney
Attorneys Sept. 1, 1953　　　　G. B. R. FEILDEN ET AL　　　　2,650,815
SPEED GOVERNOR
Filed Sept. 18, 1950　　　　　　　　　　　　　　6 Sheets-Sheet 3

Inventors
G. B. R. FEILDEN &
By R. E. WIGG
Wilkinson & Mawhinney
Attorneys

Patented Sept. 1, 1953

2,650,815

UNITED STATES PATENT OFFICE 2,650,815

SPEED GOVERNOR

Geoffrey Bertram Robert Feilden, Lincoln, and Raymond Ernest Wigg, Ealing Common, London, England, assignors to Ruston & Hornsby Limited, Lincoln, England, a British company Application September 18, 1950, Serial No. 185,372
In Great Britain September 21, 1949

7 Claims. (Cl. 264—7)

This invention relates to speed-governors of the type in which centrifugal flyweights loaded by a "speeder" spring operate a pilot-valve controlling a hydraulic relay which operates the power control, e. g. the throttle or fuel-valve of the engine to which the governor is fitted.

In its simplest form a governor of this kind, with a fixed abutment for the speeder spring, i. e. one which, though adjustable, is not displaced by changes of load on the governed engine, and having a pilot valve with substantially no lap, has a flat characteristic, i. e. is substantially isochronous; but such governors are not in general dead-beat and may even be unstable; and unless the characteristics of the engine or the load are such as to furnish the required stabilization, the governor hunts violently and friction in the flyweight-valve system aggravates the hunting tendency.

It is therefore desirable to give the governor a drooping characteristic, such that the governed speed varies with the load on the engine, a positive droop, causing the governed speed to fall with increase of load, being conducive to stability. To suit the governor to the characteristics of the governed engine and of the load, the drop may be made variable, preferably from a small negative to a larger positive value, by means of an external adjustment.

One way of providing a drooping characteristic is to interconnect the speeder-spring abutment with the piston or like movable member of the hydraulic relay by means of a lever system, so that as the movable member moves the speeder-spring abutment is moved proportionally. A positive droop will then be obtained if movement of the movable member in the direction for increasing the power-output of the engine causes the spring abutment to be moved in the direction for relaxing the effort exerted by the spring on the pilot valve when the latter is in its equilibrium position. Variation of the amount and sign of the droop may be obtained by providing means for adjustably shifting the fulcrum of the lever system.

For varying the governed speed at a given loading of the governed engine, e. g. full load, without alteration of the drooping characteristic, adjustable means for shifting the speeder-spring abutment must be provided, which means acts independently of the lever system by which the spring abutment is connected to the movable member of the hydraulic relay.

An object of the invention is to provide an improved mechanism for this purpose, in which the speeder-spring abutment is connected by a lead-screw and nut device with a member slidable in the body and pivotally connected to the lever system, and externally operable means, such as a worm and worm-wheel, are provided for relatively rotating the lead-screw and its nut to shift the abutment with respect to the member pivotally connected to the lever system.

It often happens that a large permanent droop is unacceptable, while for good stability a large droop is necessary. These apparently conflicting requirements may be satisfied by providing two separate mechanisms for obtaining a drooping characteristic, one of the kind previously discussed giving a permanent droop, which may be adjustable, and another giving a temporary droop, also optionally adjustable. The latter mechanism may comprise a follow-up member, e. g. a ported valve-sleeve, which co-operates with the flyweight actuated pilot valve spindle and is moved by the movable member of the relay through the intervention of a column of hydraulic fluid provided with an adjustable bleed or leak, the follow-up member being spring-biased to return to its initial position after displacement in either sense, and its return being controlled by the above-mentioned bleed.

Another object of the invention is to provide an improved mechanism of this kind, in which the ported sleeve is connected to the flyweight carrier by one or more flat springs, which or each of which is resiliently flexible in a plane parallel to the axis of the carrier but substantially rigid in a plane perpendicular to this axis. This spring (or springs) serves the dual purpose of biasing the sleeve to its initial position and of rotating it continuously in the body and about the pilot-valve spindle. This relative rotation tends to eliminate errors of governing arising from friction.

The degree of temporary droop obtainable by a follow-up valve member moved through the intervention of a column of hydraulic fluid by the relay can be adjustably varied by placing the hydraulic column in communication with a spring-loaded hydraulic accumulator, the spring-rate of which is adjustably variable.

A further object of the invention is to provide an improved adjustable spring-loading means of the accumulator comprising a flat spring, one end of which is secured to the movable member of the accumulator and the other to a rigid member, to which the spring is clamped at an intermediate point by a movable clamp slidable lengthwise of the spring on the rigid member and provided with means for locking it in any desired position of adjustment.

A further object of the invention is the provision of improved means for actuating an emergency device, independent of the normal power-output control means, for shutting-down the power-output of the governed engine to idling value almost instantaneously in the event of serious overspeeding. For actuating such a device, an auxiliary valve, independent of the pilot valve controlling the hydraulic relay operating the normal power-output control, is provided; and it is desirable that this auxiliary valve's operation should not partake of the temporary drooping characteristic imparted by the follow-up valve sleeve, because otherwise the engine speed would tend to attain excessive values in the event of sudden shedding of the load.

According to a further feature of the invention, the same auxiliary valve is constituted by an extension of the flyweight-operated, non-rotary pilot valve spindle and a ported, rotative sleeve surrounding it, said sleeve being connected to the hereinbefore described follow-up sleeve by a helical spring which transmits rotation from the follow-up sleeve to the said ported sleeve and presses the latter axially against a fixed abutment, and thereby prevents it from moving axially.

This arrangement causes the ported sleeve of the auxiliary valve to be rotated continuously, thus eliminating the adverse effects of friction as much as possible, and insures that the power-output is promptly shut down when the engine speed exceeds the normal governed speed for no-load conditions by a predetermined margin.

A specific example of the improved governor for controlling the fuel valve of a gas-turbine engine, the fuel-valve being incorporated in the governor assembly, is illustrated in the accompanying drawings, which also include a number of diagrammatic figures illustrating different phases of the operation of the governor, and a graphical representation of the behavior of the governor. In the drawings, Figure 1 is a central, vertical longitudinal section on the line 1—1 of Figures 2, 3, 4 and 5;

Figures 2 to 5 are vertical cross-sections on the lines 2—2, 3—3, 4—4 and 5—5 respectively of Figure 1;

Figures 7 to 14 are the diagrammatic figures above referred to; and

Figure 15 is the graphical representation above referred to.

Figure 1:
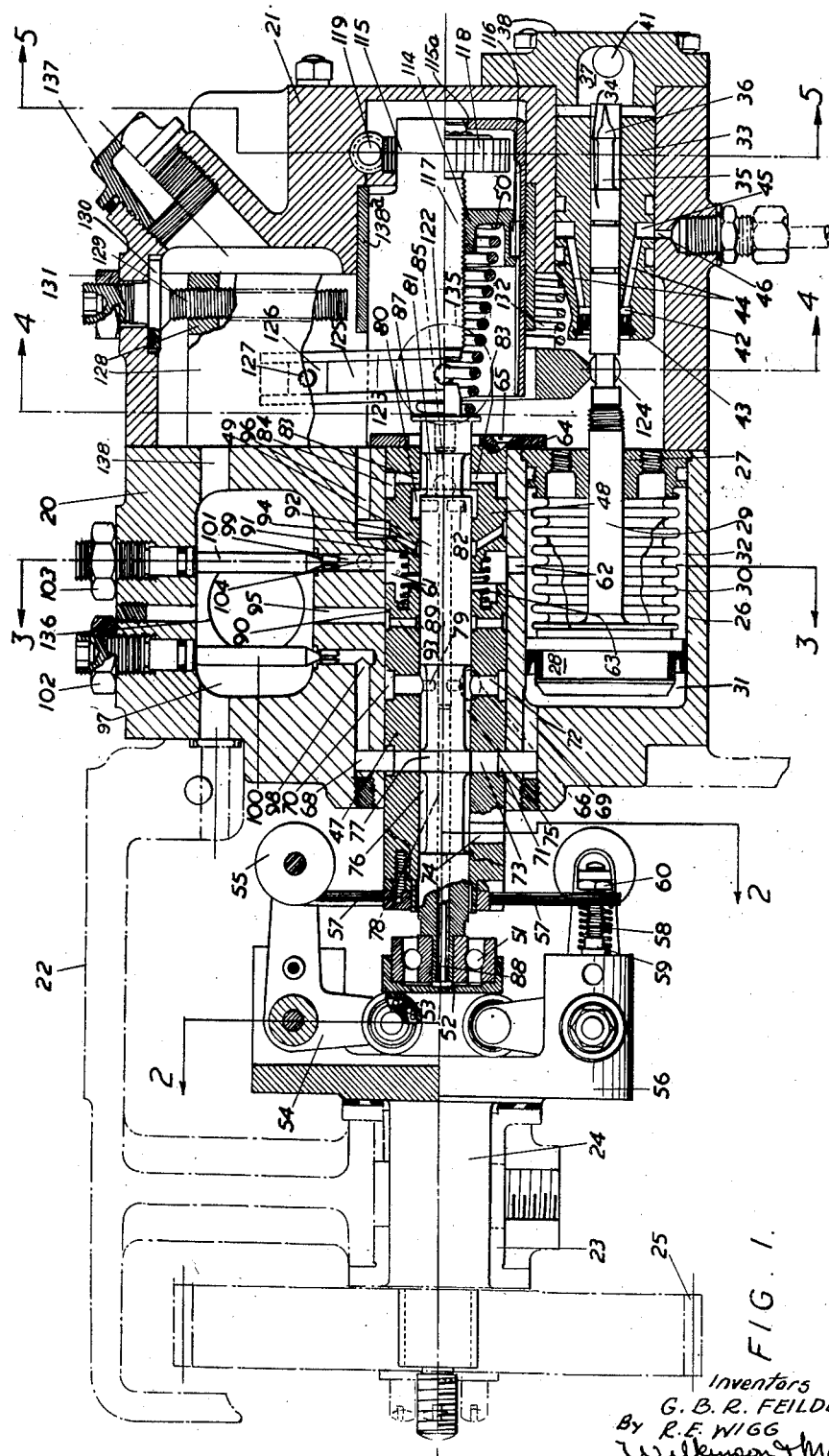

Referring to Figures 1 to 6, the fixed structure of the governor is made in two pieces, viz. a body 20 and a body-extension 21 fastened together. On the free end of the body 20 is fixed a bracket 22 carrying a bearing 23 in which is journaled the driving shaft 24 carrying a driving pinion 25.

The lower part of the body 20 is bored at 26 to provide a cylinder in which slides a relay-piston 28 and which is closed by a head 27, in which the rod 29 of piston 28 slides.

The body-extension 21 is bored coaxially with the cylinder 26 to receive a valve-body 33 in which slides a fuel-valve piston 34 necked at 35 and having tapered notches 36 in its head, which projects into a cavity 37 enclosed by cover 38. The fuel-inlet pipe is attached to a union 39 (Figure 5) communicating by a duct 40 with the annular space surrounding the neck 35; and the fuel outlet pipe is connected to the cover 38 and communicates through an opening 41 (Figures 1 and 6) with the cavity 37. A recess 42 surrounding the valve member 34 and closed by a seal 43 communicates by means of ducts 44 and an annular recess 45 in the valve body with a drain 46.

Piston 28 is connected to the cylinder head 27 by a flexible bellows 30, the interior of which is vented through openings in the head 27. The piston thus separates the working space 31 of the cylinder from an annular space 32 of variable volume between the cylinder wall and the bellows 30 enclosed by the piston 28 and the cylinder head 27.

Above the cylinder 26 and parallel to it, the body 20 is bored through to form a valve cylinder receiving rotary sleeves 47, 48, of which sleeve 47 is free to slide axially. Within the sleeves 47, 48 slides a non-rotary spindle 49, one end of which abuts on a speeder-spring 50, acting in compression, and the other end carries a thrust bearing 51 carrying a rotary thrust pad 52, engaged by rollers 53 mounted on bell-cranks 54, which carry flyweights 55 and are pivoted in a housing 56 formed integrally with the driving shaft 24. Rotation is imparted to sleeve 47 by a pair of laminated leaf springs 57, centrally clamped to the sleeve 47, their ends being apertured to receive studs 58 secured to the housing 56 and carrying helical compression springs 59 and nuts 60, between which the leaf-spring ends are located. Sleeves 47, 48 are separated by an annular gap 61 surrounding the spindle 49 and communicating with the annular space 32 through a passage 62. The gap 61 encloses a helical spring 63, which transmits rotation from sleeve 47 to sleeve 48 and holds the latter against a thrust plate 64 secured by set screws 65 to the body 20.

Spindle 49 and sleeve 47 constitute a follow-up valve controlling the displacement of the relay-piston 28. The body 20 is provided with an inlet duct 66 (Figure 3) leading from an inlet connection 67 (Figures 3 and 6) and terminating in an opening (Figure 1) in the wall of the valve cylinder. Connection is made at 67 to an external source of hydraulic fluid under the working pressure, such as the high pressure lubrication system of the engine. For convenience the working fluid will be hereafter referred to as "oil." An annular recess 68 in the body 20 communicates by a duct 69 with the working space 31 of the relay cylinder 26. Sleeve 47 has two external annular grooves 70, 71 communicating respectively with the inlet duct 66 and the annular recess 68, and by means of radial openings 72, 73 respectively with the interior of the sleeve. A further radial opening 74 is provided in the sleeve 47 outside the body 20. The spindle 49 has portions of reduced diameter providing annular clearances 75, 76 between the spindle and the sleeve 47 separated by a land 77 on the spindle, which also has an axial internal passage 78 communicating by radial openings 79 with clearance 75, which in turn communicates continuously through the openings 72 and annular recess 70 with the inlet duct 66, while clearance 76 communicates with the exterior through opening 74. The openings 73 leading from the interior of the sleeve 47 to the annular recesses 71, 68, which communicate by duct 69 with the relay cylinder, are normally covered by the land 77 of spindle 49, substantially without lap.

Sleeve 48 constitutes with spindle 49 an emergency overspeed valve. An annular clearance between the sleeve 48 and spindle 49, formed by an internal annular recess 80 in the sleeve and a necked portion 81 of the spindle, communicates by radial openings 82 with the axial passage 78 of the spindle and by radial openings 83 with an external annular recess 84 in the sleeve 48; and the latter communicates with a duct 85 formed in the body 20 leading to an external connection 86 (Figure 6), which is connected to a device (not shown), e. g. a compressor blow-off valve, for shutting down the engine when the hydraulic pressure in duct 85 is released by displacement of the spindle 49, to the right as seen in Figure 1, so as to expose its necked portion 81 outside the sleeve 48 and thus vent the clearance 80, 81 to the interior of the body-extension 21. The venting of clearance 80, 81 occurs when the spindle 49 reaches a definite position with respect to the body 20, corresponding to a specific increase of speed over the governing speed immediately prior to the increase.

The axial channel 78 of spindle 49 is closed at one end by a plug carrying a speeder-spring thrust plate 87, and is partially closed at the other end by a restrictor 88 providing a bleed for lubricating the thrust bearing 51.

Sleeve 47 is further provided with internal and external annular recesses 89, 90 interconnected by radial passages 93; and sleeve 48 has similar internal and external recesses 91, 92 interconnected by radial passages 94. Recesses 90, 92 communicate with ducts 95, 96 respectively, formed in the body 20. These sets of passages constitute drains isolating the annular gap 61 between sleeves 47, 48 from leakage of high-pressure oil from the annular recesses and clearances 70, 84, 75, 80 which are under the feed pressure, as supplied through the inlet connection 67.

Since the sleeves 47, 48 rotate continuously, while the body 20 and spindle 49 do not rotate, the surfaces of contact between these parts are subject to continuous, steady relative movement which minimizes irregularities of operation due to friction.

In the upper part of the body 20 is a reservoir 97, of which the upper part is vented by an opening 138 leading to the interior of the body-extension 21, and the lower part communicates with the annular recess 68 by a duct 98 and with the annular gap 61 by a duct 99. The openings of ducts 98, 99 into the reservoir 97 are provided with adjustable restrictors 100, 101 in the form of guided needles having externally exposed screwed heads carrying adjusting nuts 102, 103. The drain duct 95 also leads into the reservoir 97, while drain duct 96 leads into the cavity of the body-extension 21.

From the duct 99, a side branch 104 (see Figures 1 and 3) leads into a cavity 105 closed by a cover 106, to the inner face of which is secured a flexible bellows 107, the interior of the bellows being vented through openings in the cover 106.

To the closed, free end of the bellows and coaxial therewith is secured a rod 108 which slides in the cover 106. The exposed end of rod 108 is attached to one end of a leaf spring 109, of which the other end is clamped to a rigid slide bar 110 secured to the cover 106 and carrying an adjustable slide composed of headed studs 111 carrying clamping nuts 112 (only one stud and nut being seen in Figure 3), and a pair of clamping bars 113, between which the spring 109 is clamped. The effective length and consequently the stiffness of spring 109 can be varied by adjusting the slides 111, 112, 113 up and down the slide bar 110. The cavity 105 therefore constitutes a hydraulic accumulator loaded by the spring 109 whose stiffness is adjustable.

The outer end of the speeder-spring 50 abuts on an abutment cup 114 which slides in a thimble 115 and is prevented from rotating by a key 116 engaging in a keyway formed in the thimble. The central boss of the abutment cup 114 is threaded to constitute a nut threaded on a lead-screw 117 terminating in a spigot supported in a spigot bearing 115a in the head of the thimble 115, which bearing 115a transmits to the thimble the end load in the lead screw due to the thrust of the speeder spring. The lead screw 117 carries an integral spur pinion 118 (Figures 1 and 5) engaged by a worm 119 supported in bearings formed in the body-extension 21 and having an integral flange 120 (Figure 5) located between a shoulder of the body extension and a ferrule 121, in the recess of which the end of the worm 119 is exposed for connection to the speeder-spring adjusting control system (not illustrated).

The thimble 115 is slidable axially in a bushing 138a mounted in the body-extension 21 and is pivotally connected by pins 122 with a lever 123 in the form of an apertured plate (see also Figure 4), of which the lower end is extended in the form of a striking fork 124 engaging a reduced diameter portion of the fuel-valve piston 34. The sides of lever 123 are formed with guideways 125 in which are slidable trunnion blocks 126 pivoted on trunnions 127 mounted in a yoke 128 vertically displaceable by a lead screw 129 which extends outside the body-extension 21 and is axially located by a collar 130 integral with the lead screw and an external nut 131.

In order that axial displacement of the worm wheel 118 by the lever 123 and thimble 115 may not disturb the manual speed setting, the worm wheel 118 has straight-spur teeth of sufficient axial length to accommodate the axial displacement, the tooth pitch being sufficient to allow for the helical angularity of the worm 119. Alternatively, the worm wheel may have helical teeth and be mounted on the shaft of the lead-screw 117 by means of a key and keyway enabling relative sliding to take place, in which case the worm wheel 118 must be axially located in the body extension 21 by means of suitable thrust bearings, the lead-screw 117 being axially located in the thimble 115 by other such bearings.

Between the lower part of lever 123 and abutments in the body-extension 21 are arranged a pair of compression helical springs 132 (Figures 1 and 5) which oppose the effort of the speeder-spring 50 on the lever and serve as relay-piston return-springs, since their effort, reduced by the opposed effort of the speeder-spring 50, is transmitted by the lever 123 to the fuel-valve piston 34 and is opposed to that exerted by the relay-piston 28. The effective returning effort on the relay-piston depends on the position of fulcrum 127 and is least when the fulcrum is at its highest setting. The springs 132 are made powerful enough for the net returning effort in this position to be adequate to return the relay-piston at any fuel-valve setting.

The striking fork 124 of lever 123 has a shoulder engageable by an eccentric pin 133 (Figure 4) on the end of a spindle 134, which is rotatably adjustable in the body-extension 21 from the outside. This furnishes an adjustable stop for the fuel-valve piston 34 limiting the extent to which the valve can be closed by the governor when the engine is running under no-load conditions.

A transparent window 135 (Figures 4 and 6) in the body-extension 21 enables the position of lever 123 to be observed; and a similar window 136 (Figures 1 and 6) in the body 20 enables the level of oil in the reservoir 97 to be observed.

Figure 6:
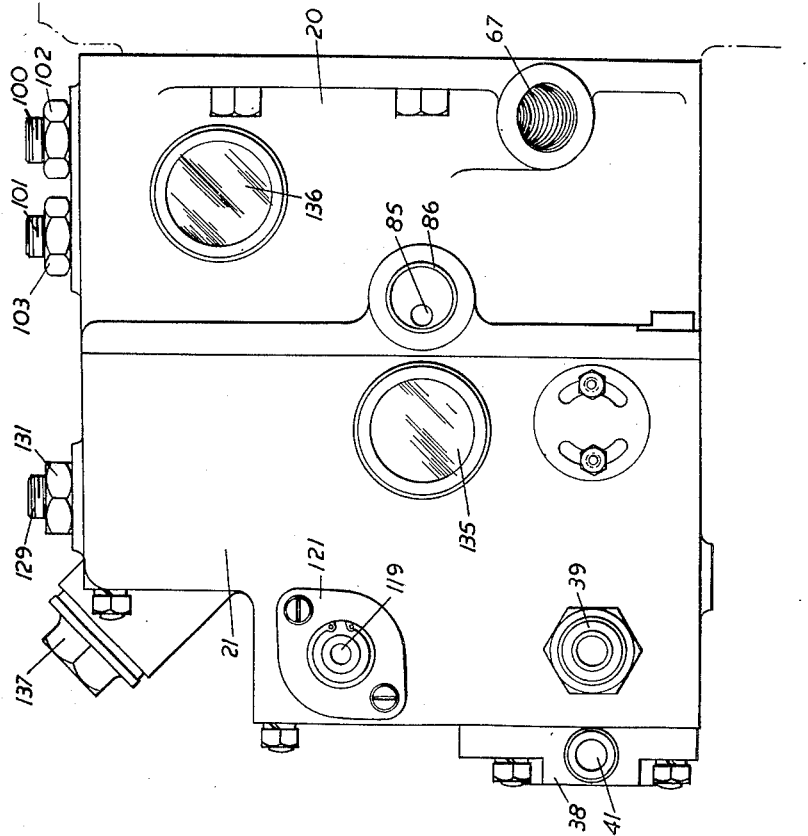
Figure 6 is a side elevation viewed in the direction of arrows 6 of Figures 2, 3, 4 and 5.
Figure 4:
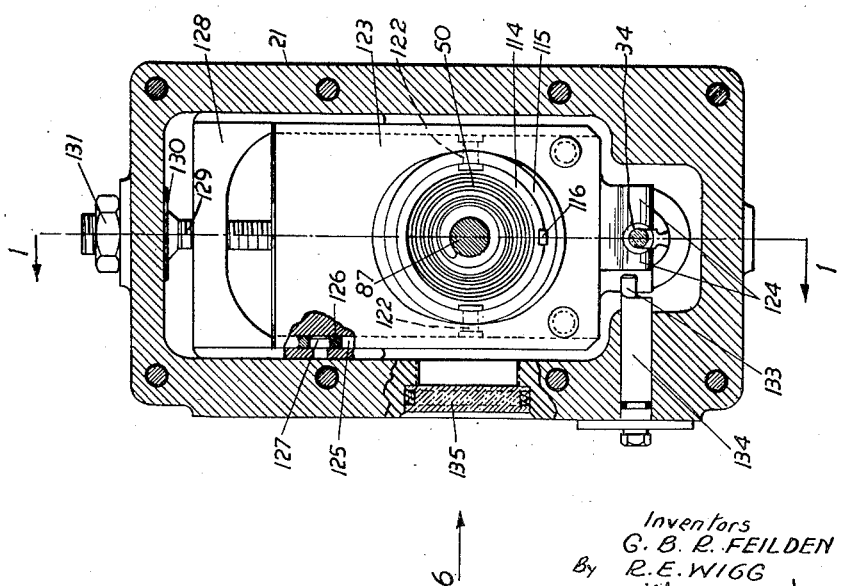

The body-extension 21 has a filler opening, closed by a plug 137, for filling the cavity of the body-extension with oil (Figures 1 and 6).

Before describing the operation of the governor in detail, the following points may usefully be noted:

(i) If the restrictor 101 is completely closed a column of oil contained in the space 32, 62, 61, 99, 104, 105 is completely confined, and since oil is only very slightly compressible, the volume of the column cannot vary substantially. Therefore, provided that this column completely fills the above-mentioned space and is maintained under positive pressure, it acts substantially as a rigid connection between the relay-piston 28 and the sliding sleeve 47, so that, when the relay-piston moves outwards (to the right in Figure 1), under the admission of oil to the working space 31 of the cylinder 26, oil is expelled from the annular space 32 into the gap 61 and thereby drives the sleeve 47 to the left as seen in Figure 1.

Movement in either direction of sleeve 47 is resisted by springs 57 (it may here be mentioned that the effort of spring 63 is negligible in comparison with that of springs 57).

When the relay-piston moves inwards, oil is sucked into the annular space 32 from the gap 61, which will close, so as to keep the space 32, 62, 61, 99, 104, 105 filled, provided that the external thrust on the sleeve 47 is positive. The outer face of this sleeve is under atmospheric pressure which supplies the necessary positive thrust when the opposed efforts of springs 57 and 63 are in equilibrium, and the external thrust will remain positive until springs 57 are deflected (to the right in Figure 1) far enough for their effort (to which is added that of spring 63) to balance the atmospheric pressure. Deflection of this order is well outside the normal operating range.

(ii) If the restrictor 101 is opened the pressure in the space 32, 62, 61, 99, 104, 105 will equalise with that of the atmosphere, since the reservoir 97 is vented at 138 to the interior of the body-extension 21 which is at atmospheric pressure, and the springs 57 will return sleeve 47 to its neutral position after a delay depending on the setting of the restrictor 101 which determines the rate of bleed to or from the reservoir 97 through the duct 99.

(iii) The accumulator 105—108 takes or gives up part of the oil expelled from or drawn into space 32 and the column of liquid 32, 62, 61, 99, 104, 105 then operates not as a rigid connection between piston 28 and sleeve 47, but as a resilient connection, whose stiffness, which depends on the adjustment of spring 109, determines the ratio of the (initial) displacement of sleeve 47 to that of piston 28.

When the land 77 of valve-spindle 49 (by relative movement to the left in Figure 1) exposes the radial openings 73 of sleeve 47, leading to the annular recesses 71 and 68, to the annular clearance 75, which communicates with the inlet duct 66 by way of openings 72 and the annular recess 70, it not only admits the oil under the supply pressure to the working space 31 of cylinder 26 by way of the duct 69, but also to duct 98 leading to the reservoir 97 past the adjustable restrictor 100, which therefore constitutes an adjustable leak or bleed from the pressure oil supply to the relay cylinder. The effect of this is to de-sensitize the governor to an extent depending on the adjustment of the restrictor 100, for the freer is the leakage past the restrictor the more widely must the openings 73 be uncovered by the land 77 to achieve a given flow through duct 69 into the cylinder space 31. In fact, the land 77 must move far enough (relatively to sleeve 47) to "beat the leak" before the oil can reach the relay cylinder.

(v) As the relay-piston 28 moves, it rocks the lever 123 about its (adjustable) fulcrum 127 and thereby displaces the thimble 115, lead-screw 117 and abutment cup 114, so as to relax the speeder-spring 50 as the fuel-valve 34, 35, 36 is opened and conversely, when the fulcrum 127 is above the pivotal connection 122 of the lever 123 to the thimble 115. This action is reversed if the fulcrum 127 is adjusted to be below the axis of pivots 122. (At its lowest possible position the fulcrum 127 is above the striking fork 124.) Slackening of the spring 50 of course decreases the governed speed, and conversely; and since opening of the fuel-valve is the governed response to increased load, and conversely, the governed speed decreases with increase of load, giving a permanent drooping characteristic to the governor, if the fulcrum 127 is above the pivotal connection 122; and if the fulcrum is substantially below the pivotal connection, the governor characteristic will be rising. To obtain a perfectly droopless characteristic, the fulcrum 127 must be slightly below the pivot 122, since leakages in the valve system as well as the bleed past restrictor 100 introduces a slight "droop" in the characteristic, unless compensated.

Figure 7:
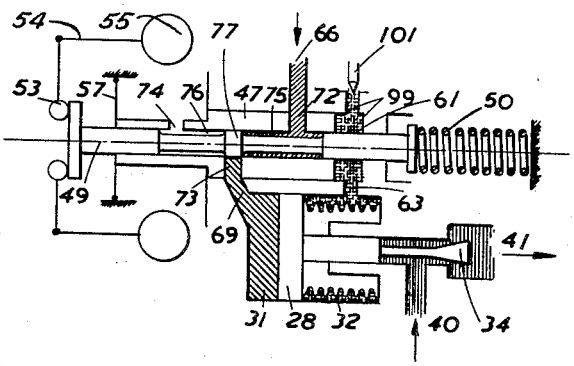

The operation of the governor is as follows: assuming the engine to be running steadily at the governed speed, the spindle 49 is in equilibrium between the thrust of the speeder-spring 50 and the opposed thrust of the rollers 53 due to the centrifugal forces on the flyweights 55 transmitted through the bell cranks 54; and the sleeve 47 is in equilibrium under the opposed effects of spring 63 and springs 57 in the position shown (in Figure 1), in which its openings 73 are covered by the land 77 of the spindle 49, so that no flow takes place into or out of the relay-cylinder space 31 (Figure 7).

Figure 8:
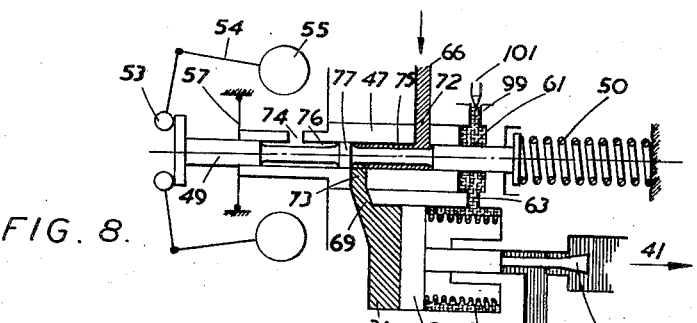

If the load on the engine increases, causing the speed to fall off, the flyweights collapse inwards and allow the speeder-spring to move the spindle 49 to the left (as seen in Figures 1 and 7 to 14) and uncover openings 73 so as to admit the oil, supplied under pressure through inlet duct 66, recess 70, openings 72 and clearance 75, to the cylinder space 31, via openings 73, recesses 71 and 68, and duct 69, causing the relay-piston 28, rod 29 and fuel valve-piston 34, to move to the right and increase the fuel-valve opening (Figure 8). The engine therefore accelerates again and this tends to return the flyweights 55 and spindle 49 towards their initial position.

At the same time the volume of space 32 in the relay-cylinder is decreased and oil is expelled therefrom through opening 62. The expelled oil is accommodated by increase of volume of the annular gap 61 between sleeves 47 and 48, the sleeve 47 being displaced to the left, thus straining the springs 57.

Figure 9:
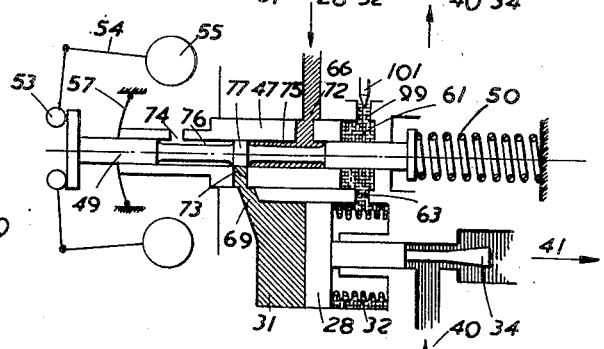

Movement of the piston 28 and sleeve 47 continues until the openings 73 are again closed, but as the sleeve 47 has moved to the left the governor stabilises with the spindle 49 slightly to the left of its initial position at a somewhat lower speed than the original governed speed (Figure 9). The effect of the follow-up sleeve 47 is therefore to give the governor a drooping characteristic, i. e. the governed speed decreases with increase of load.

Figure 10:
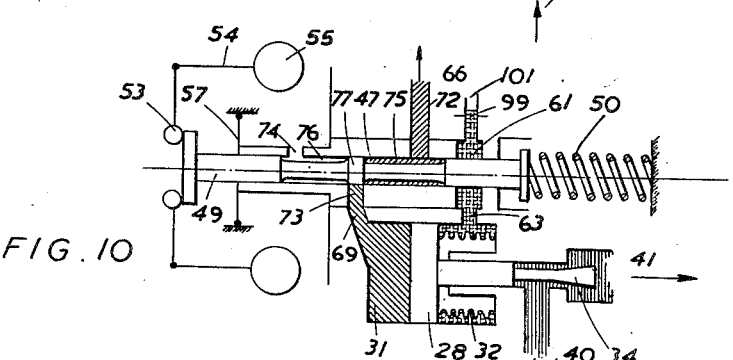

This droop is only temporary unless the restrictor 101 is completely closed, for the straining of springs 57 applies pressure to the column of oil in space 32, 62, 61 causing a slow bleed from this space through duct 99 past the restrictor 101 into the reservoir 97, while the consequential displacement to the right of sleeve 47, as the volume of the column of liquid in space 32, 62, 61 decreases, slightly re-exposes the openings 73 allowing more oil to enter the cylinder space 31 and thus move the relay-piston further to the right and increase the fuel valve opening, so as to accelerate the engine and cause the spindle 49 to move to the right and follow the sleeve 47. This continues until the initial position of springs 57, sleeve 47, spindle 49, and flyweights 55 is reached when the governor stabilises at the former speed but with the fuel valve wider open to enable the engine to carry the increased load (Figure 10).

Figure 11:
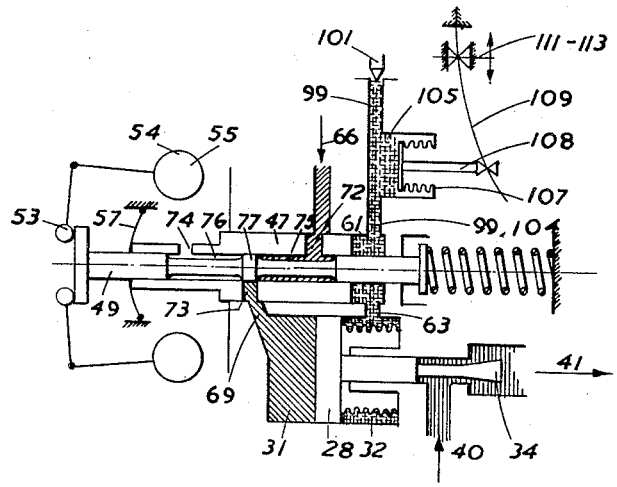

The extent of the temporary droop in the governor characteristic is regulated by the setting of the movable clamp 111, 112, 113, for the accumulator 105 absorbs part of the oil expelled from space 32, thus reducing the increase of volume of the annular gap 61, and the position of the sleeve 47 when equilibrium is temporarily established as in Figure 9 is determined by the stiffness of the accumulator spring 109, as adjusted by the movable clamp 111, 112, 113, relatively to that of the springs 57 (Figure 11).

The sequence of events when the load is decreased is similar to that described above, the displacements of the several parts being in the reverse direction. Movement of spindle 49 to the right relative to sleeve 47 uncovers the openings 73 so as to allow the oil to escape from the cylinder space 31 into clearance 76 and thence to the exhaust opening 74.

Figure 12:
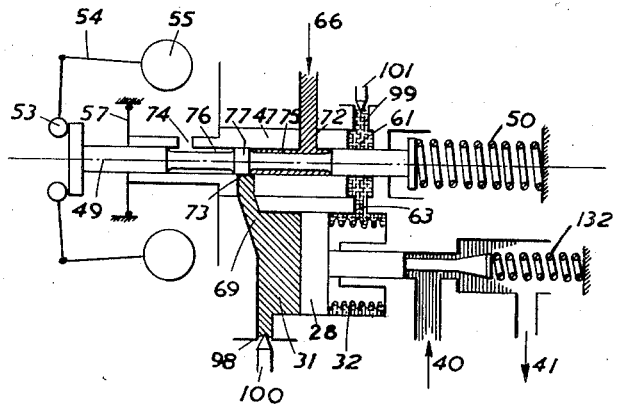

The function of the adjustable restrictor 100 in de-sensitizing the governor has already been explained at (iv) above. It is illustrated in Figure 12. As the pressure in the cylinder space 31 required to overcome the resistance of the relay-piston return-springs 132 increases as the fuel-valve is opened, i. e. as the load increases, necessitating wider uncovering of the openings 73 for a given flow of oil when the load changes, the de-sensitizing effect of the bleed for a given setting of the restrictor 100 is greater as the load increases.

Figure 13:
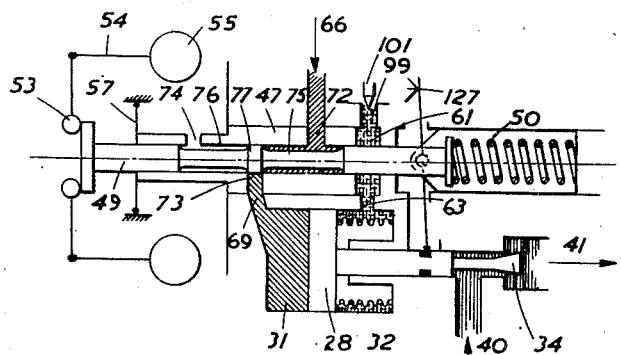
Figure 14:
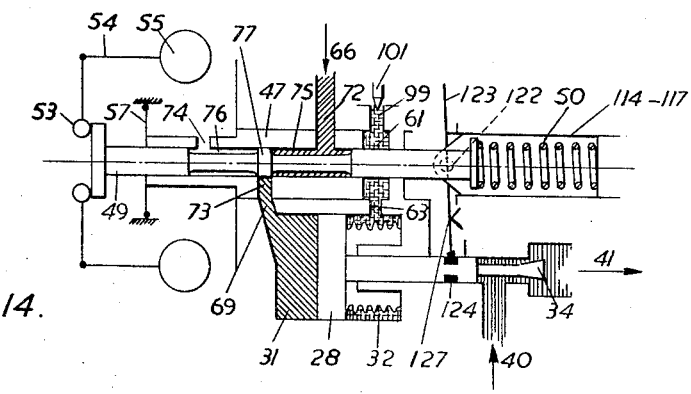

The function of the lever 123 and associated mechanism in providing a permanent drooping (or rising) characteristic has already been described at (v) above; and since the position of fulcrum 127 is adjustable from outside the governor, the degree of permanent droop (positive or negative) may be varied at will during running, as illustrated in Figures 13 and 14, Figure 13 showing a setting for permanent (positive) droop and Figure 14 the setting for compensating leakage so as to give true isochronism.

Figure 15:
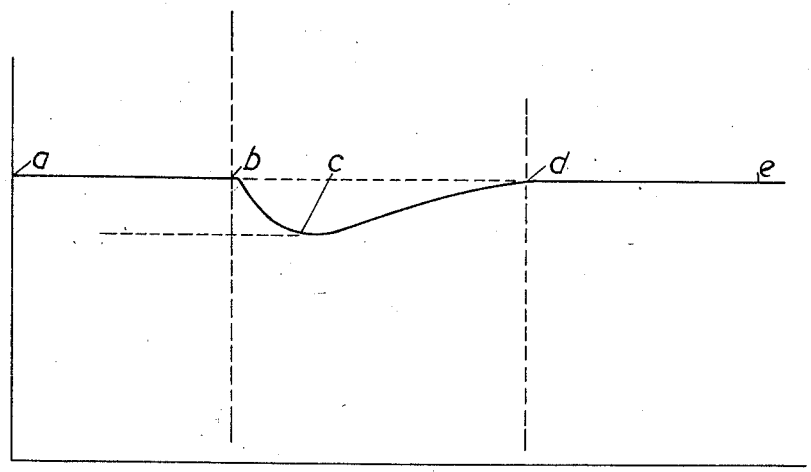

Figure 15 illustrates the functioning of the governor. The abscissae represent time and the ordinates speed. From $a$ to $b$ the engine is running steadily at the governed speed. At $b$ an increase of load occurs. If it were instantaneous the curve would rise momentarily but as the increase normally requires a finite time the governor can "keep pace with it." The temporary droop due to the follow-up valve system causes the curve to droop from $b$ to $c$, representing temporary stabilization at a lower speed. From $c$ to $d$ the curve rises again to the original speed owing to the action of the bleed from the oil column acting on the follow-up sleeve. The governor then stabilises at the original speed with the engine running under increased load ($d$ to $e$). If the fulcrum 127 is set for permanent droop the line $de$ would be below the level of the line $ab$.

The extent of the temporary droop from $b$ to $c$ is determined by the setting of the accumulator springs 109; and the time of recovery from $c$ to $d$ by the setting of the restrictor 101.

The "overspeed" valve 49, 48 comes into operation to shut down the engine, if the speed rises by more than a certain percentage, say 5%, over the governed speed immediately before the overspeed. This governed speed depends on the load unless the fulcrum 127 of the lever 123 is set so as to give a characteristic with zero droop, but the action of the overspeed valve is independent of the temporary droop due to the follow-up sleeve 47.

We claim:

1. In a governor for governing the speed of a prime mover, a hydraulic servo-motor for controlling the power-output of the governed prime mover and comprising a movable and an immovable member together defining a working space of variable volume; valve means controlling the entry and discharge of hydraulic fluid from said working space and comprising a ported valve body, a ported valve-sleeve slidable and rotatable therein and a valve-piston slidable axially in said sleeve; spring-loaded centrifugal means for controllably displacing the valve-piston axially including a flyweight carrier rotatable by the governed prime mover coaxially with the valve-piston and -sleeve, flyweights pivotally mounted thereon and a speeder spring, which latter engages the valve-piston and besides controlling its axial displacement prevents it from rotating; and hydraulic- and spring-means for controllably displacing the valve-sleeve axially, including means confining a column of hydraulic fluid constituting a motion-transmitting connection between the movable member of the servo-motor and the valve-sleeve, adjustable means providing a variable leak from and to said column and a spring connecting the valve-sleeve to the flyweight-carrier, said last-named spring on the one hand being resiliently yielding in a plane containing the common axis of the valve-sleeve and flyweight-carrier, thus enabling the valve-sleeve to be displaced axially in either sense, while tending always to return said sleeve to the same position, and on the other hand being substantially rigid in a plane perpendicular to said axis to constitute a driving connection by which the flyweight-carrier imparts rotation to the valve-sleeve.

2. In a governor for governing the speed of a prime mover, a hydraulic servo-motor for controlling the power-output of the governed prime mover and comprising a movable and an immovable member together defining a working space of variable volume; valve means controlling the entry and discharge of hydraulic fluid from said working space and comprising a ported valve body, a ported valve-sleeve slidable and rotatable therein and a valve-piston slidable axially in said sleeve; spring-loaded centrifugal means for controllably displacing the valve-piston axially including a flyweight carrier rotatable by the governed prime mover coaxially with the valve-piston and -sleeve, flyweights pivotally mounted thereon and a speeder spring; hydraulic means for controllably displacing the valve-sleeve axially, including means confining a column of hydraulic fluid constituting a motion-transmitting connection between the movable member of the servo-motor and the valve-sleeve, adjustable means providing a variable leak from and to said column, an hydraulic accumulator in communication with said column having adjustable spring-loading means comprising a fixed, rigid member, a flat spring and an adjustable clamp, one end of said last-named spring being secured to the rigid member and the other to the accumulator, and the adjustable clamp being displaceable lengthwise of said last-named spring to clamp a selected intermediate point thereof to the rigid member; and spring means tending always to return said valve-sleeve to the same position.

3. A governor as defined in claim 2, whereof the fixed rigid member to which the accumulator spring is secured is constituted by a flanged bar, the adjustable clamp being slidable thereon and provided with means for engaging and gripping the flanges of said bar.

4. In a governor for governing the speed of a prime mover, a hydraulic servo-motor for controlling the power-output of the governed prime mover and comprising a movable and an immovable member together defining a working space of variable volume; valve means controlling the entry and discharge of hydraulic fluid from said working space and comprising a ported valve body, a ported valve-sleeve slidable and rotatable therein and a valve-piston slidable axially in said sleeve; spring-loaded centrifugal means for controllably displacing the valve-piston axially including a flyweight carrier rotatable by the governed prime mover coaxially with the valve-piston and -sleeve, flyweights pivotally mounted thereon and a speeder spring, which latter is attached to the valve-piston and prevents it from rotating; hydraulic- and spring-means for controllably displacing the valve-sleeve axially, including means confining a column of hydraulic fluid constituting a motion-transmitting connection between the movable member of the servo-motor and the valve-sleeve, adjustable means providing a variable leak from and to said column and a spring tending always to return said valve-sleeve to the same position; a device for rapidly reducing the power output of the governed prime mover, a second valve-sleeve rotatable in the valve body coaxially with the first mentioned valve-sleeve and cooperative with an extended part of the valve-piston for controlling the flow of hydraulic fluid through a port of the valve body adapted to be connected to said device for rapidly reducing the power output of the governed prime mover, an abutment restricting axial displacement of said second valve-sleeve in one direction, and a helical spring inter-connecting the two valve-sleeves and resiliently transmitting rotation from the first to the second of said sleeves, and being also operative in compression to press said second valve-sleeve against said abutment and thereby prevent it from moving axially, whereby the opening and closing by the valve-piston of the ports of the second valve-sleeve is determined only by the position of the valve-piston and hence occurs at an invariable critical speed.

5. In a governor for governing the speed of a prime mover, a hydraulic servo-motor for controlling the power-output of the governed prime mover and comprising a movable member and an immovable body together defining a working space of variable volume; valve means controlling the entry and discharge of hydraulic fluid from said working space and comprising a ported valve-sleeve rotatable in a ported part of the body and a valve-piston slidable axially in said sleeve; spring-loaded centrifugal means for controllably displacing the valve-piston axially including a flyweight carrier rotatable by the governed prime mover coaxially with the valve-piston and -sleeve, flyweights pivotally mounted thereon and a speeder spring, which engages the valve-piston and besides controlling its axial displacement prevents it from rotating, a lever fulcrumed on the body and connected to the movable member of the servo-motor for angular displacement thereby proportionally to the displacements of said movable member, a speeder-spring-abutment-housing slidable axially of said valve-piston and pivotally connected to said lever, a speeder-spring-abutment slidable axially of said valve-piston in said abutment-housing, means preventing rotation of said abutment in said abutment-housing, a lead screw coaxial with said valve-piston in threaded engagement with said speeder-spring abutment, a thrust bearing formed in said abutment-housing to receive said lead-screw and transfer the thrust of the speeder-spring to said abutment-housing, and externally operable gearing for rotating said lead screw.

6. A governor as defined in claim 5, in which the mentioned externally operable gearing comprises a worm and worm wheel.

7. In a governor for governing the speed of a prime mover, a hydraulic servo-motor for controlling the power-output of the governed prime mover and comprising a movable member and an immovable body together defining a working space of variable volume; valve means controlling the entry and discharge of hydraulic fluid to and from said working space and comprising a valve-piston slidable axially in said body; spring-loaded centrifugal means for controllably displacing the valve-piston axially including a flyweight carrier rotatable by the governed prime mover coaxially with the valve-piston, flyweights pivotally mounted thereon and a speeder spring, which is operative on the valve-piston and controls its axial displacement, a lever fulcrumed on the body and connected to the movable member of the servo-motor for angular displacement thereby proportionally to the displacements of said movable member, a speeder-spring abutment assembly comprising two elements each of which is slidable in said body axially of the valve-piston, one of said elements constituting the abutment of the speeder-spring and the other such element being pivotally connected to said lever, a lead-screw in threaded engagement with one of said elements and axially located by the other such element, and externally operable gearing for imparting relative rotation to said lead-screw and the element with which it is in threaded engagement to shift the abutment element axially with respect to the element pivotally connected to the lever.

GEOFFREY BERTRAM ROBERT FEILDEN.
RAYMOND ERNEST WIGG.

References Cited in the file of this patent

UNITED STATES PATENTS

| Number | Name | Date |
|---|---|---|
| 2,179,696 | Keel et al. | Nov. 14, 1939 |
| 2,333,184 | Kalin | Nov. 2, 1943 |
| 2,341,384 | Kalin | Feb. 8, 1944 |
| 2,344,308 | Kalin | Mar. 14, 1944 |
| 2,364,116 | Whitehead | Dec. 5, 1944 |
| 2,364,817 | Reggio | Dec. 12, 1944 |
| 2,371,157 | Drake | Mar. 13, 1945 |